(12) United States Patent
Ahlstrom et al.

(10) Patent No.: US 12,547,661 B2
(45) Date of Patent: Feb. 10, 2026

(54) TRANSFORMATION OF DATABASE ENTRIES FOR IMPROVED ASSOCIATION WITH RELATED CONTENT ITEMS

(71) Applicant: Charles Schwab & Co., Inc, San Francisco, CA (US)

(72) Inventors: Logan Sommers Ahlstrom, Ann Arbor, MI (US); Dayanand Narregudem, Ann Arbor, MI (US); Ravindra Reddy Tappeta Venkata, Novi, MI (US); Jeffrey Michael Freisthler, Ann Arbor, MI (US); Kinga Sliwa, Northbrook, IL (US); Tomas Jesus Ruiz, Chicago, IL (US)

(73) Assignee: Charles Schwab & Co., Inc., San Francisco, CA (US)

( * ) Notice: Subject to any disclaimer, the term of this patent is extended or adjusted under 35 U.S.C. 154(b) by 0 days.

(21) Appl. No.: 18/446,813

(22) Filed: Aug. 9, 2023

(65) Prior Publication Data
US 2023/0385335 A1 Nov. 30, 2023

Related U.S. Application Data

(63) Continuation of application No. 17/888,868, filed on Aug. 16, 2022, now Pat. No. 11,762,904, which is a
(Continued)

(51) Int. Cl.
*G06F 16/74* (2019.01)
*G06F 3/0482* (2013.01)
(Continued)

(52) U.S. Cl.
CPC ......... *G06F 16/748* (2019.01); *G06F 3/0482* (2013.01); *G06F 3/04842* (2013.01); *G06F 16/7867* (2019.01); *G06F 16/9558* (2019.01)

(58) Field of Classification Search
CPC .............. G06F 16/748; G06F 16/9558; G06F 16/7687; G06F 3/0482; G06F 3/04842
See application file for complete search history.

(56) References Cited

U.S. PATENT DOCUMENTS 5,508,718 A * 4/1996 Haikin ................. G06T 11/001
  345/601
5,550,971 A * 8/1996 Brunner ............ G06F 16/24552
(Continued)

OTHER PUBLICATIONS

Cuneyt Taskiran et al., Automated Video Summarization Using Speech Transcripts, Published 2001 via citeseer, pp. 1-2 (pdf).
(Continued)

*Primary Examiner* — Nicholas Augustine
(74) *Attorney, Agent, or Firm* — Harness, Dickey & Pierce, P.L.C.

(57) ABSTRACT

A content analysis system includes processor and memory hardware storing data analyzed content items and instructions for execution by the processor hardware. The instructions include, in response to a first intermediate content item being analyzed to generate a first text description, receiving the first intermediate content item and analyzing the first text description to generate a first reduced text description. The instructions include identifying a first set of tags by applying a tag model to the first text description and generating a first analyzed content item. The instructions include adding the first analyzed content item to the analyzed content database and, in response to a displayed content item being associated with at least one tag of the first set of tags, displaying a first user-selectable link corresponding to the first analyzed content item on a portion of a user interface of a user device displaying the displayed content item.

19 Claims, 7 Drawing Sheets

Related U.S. Application Data continuation of application No. 17/114,418, filed on Dec. 7, 2020, now Pat. No. 11,550,844.

(51) Int. Cl.
  *G06F 3/04842*  (2022.01)
  *G06F 16/78*  (2019.01)
  *G06F 16/955*  (2019.01)

(56) References Cited

U.S. PATENT DOCUMENTS

| | | | | |
|---|---|---|---|---|
| 5,604,860 A * | 2/1997 | McLaughlin | G03G 15/502 | 715/810 |
| 5,611,059 A * | 3/1997 | Benton | G05B 19/0426 | 715/965 |
| 5,673,401 A * | 9/1997 | Volk | H04N 21/42204 | 348/E7.071 |
| 5,726,883 A * | 3/1998 | Levine | G03G 15/502 | 700/83 |
| 5,754,174 A * | 5/1998 | Carpenter | G06F 3/0481 | 715/810 |
| 5,832,496 A * | 11/1998 | Anand | G06F 16/986 | 707/E17.118 |
| 5,870,088 A * | 2/1999 | Washington | G06F 3/04847 | 707/999.102 |
| 5,956,024 A * | 9/1999 | Strickland | G06Q 30/02 | 715/717 |
| 6,014,138 A * | 1/2000 | Cain | G06F 8/24 | 715/744 |
| 6,137,485 A * | 10/2000 | Kawai | H04N 7/15 | 348/E7.083 |
| 6,144,962 A * | 11/2000 | Weinberg | G06Q 30/02 | 714/E11.181 |
| 6,199,099 B1 * | 3/2001 | Gershman | G06F 16/9537 | 709/201 |
| 6,212,524 B1 * | 4/2001 | Weissman | G06F 16/283 | 707/769 |
| 6,222,540 B1 * | 4/2001 | Sacerdoti | G06F 16/248 | 345/440.1 |
| 6,275,225 B1 * | 8/2001 | Rangarajan | G06F 9/451 | 715/969 |
| 6,330,007 B1 * | 12/2001 | Isreal | G06F 8/38 | 715/764 |
| 6,353,446 B1 * | 3/2002 | Vaughn | H04L 41/22 | 715/733 |
| 6,356,905 B1 * | 3/2002 | Gershman | G06Q 30/0633 | 707/999.005 |
| 6,377,993 B1 * | 4/2002 | Brandt | H04L 41/18 | 709/227 |
| 6,601,233 B1 * | 7/2003 | Underwood | G06F 8/24 | 717/102 |
| 6,621,508 B1 * | 9/2003 | Shiraishi | G06F 3/0481 | 715/764 |
| 6,643,661 B2 * | 11/2003 | Polizzi | G06F 16/972 | 707/711 |
| 6,668,253 B1 * | 12/2003 | Thompson | G06Q 10/06 | |
| 6,678,634 B1 * | 1/2004 | Wendt | B21B 38/04 | 702/170 |
| 6,714,219 B2 * | 3/2004 | Lindhorst | G06F 8/34 | 715/769 |
| 6,748,394 B2 * | 6/2004 | Shah | G06F 21/6227 | 707/999.102 |
| 6,757,681 B1 * | 6/2004 | Bertram | H04L 43/067 | 707/999.102 |
| 6,792,475 B1 * | 9/2004 | Arcuri | G06F 40/166 | 715/239 |
| 6,832,263 B2 * | 12/2004 | Polizzi | G06F 16/954 | 707/999.101 |
| 6,889,096 B2 * | 5/2005 | Spriggs | G06F 9/451 | 705/28 |
| 6,895,409 B2 * | 5/2005 | Uluakar | G06F 8/20 | 717/121 |
| 6,918,091 B2 * | 7/2005 | Leavitt | G06F 3/0482 | 715/779 |
| 6,941,311 B2 * | 9/2005 | Shah | G06F 16/24557 | 707/999.102 |
| 6,947,929 B2 * | 9/2005 | Bruce | G06F 16/24575 | 707/999.005 |
| 6,990,520 B2 * | 1/2006 | Green | H04L 41/0873 | 709/224 |
| 7,007,029 B1 * | 2/2006 | Chen | G06Q 30/00 | |
| 7,030,890 B1 * | 4/2006 | Jouet | G06F 9/451 | 345/589 |
| 7,228,187 B2 * | 6/2007 | Tich | G06Q 10/04 | 700/83 |
| 7,363,308 B2 | 4/2008 | Dillon et al. | | |
| 7,640,240 B2 | 12/2009 | Boal et al. | | |
| 7,853,558 B2 | 12/2010 | Brindley | | |
| 9,189,525 B2 | 11/2015 | Acharya et al. | | |
| 9,530,452 B2 | 12/2016 | McIntosh et al. | | |
| 10,496,905 B2 * | 12/2019 | Solomon | G10L 15/02 | |
| 10,515,133 B1 * | 12/2019 | Sharifi | G06F 16/48 | |
| 10,529,137 B1 * | 1/2020 | Black | G06V 20/653 | |
| 2002/0054141 A1 * | 5/2002 | Yen | G09G 5/14 | 715/804 |
| 2002/0095651 A1 * | 7/2002 | Kumar | H04L 67/567 | 707/E17.119 |
| 2002/0123915 A1 * | 9/2002 | Denning | G06Q 10/06 | 705/7.11 |
| 2002/0138158 A1 * | 9/2002 | Landreth | G05B 15/02 | 714/1 |
| 2002/0138527 A1 * | 9/2002 | Bell | G06Q 10/10 | 715/255 |
| 2002/0186257 A1 * | 12/2002 | Cadiz | G06F 16/9535 | 715/838 |
| 2003/0020671 A1 * | 1/2003 | Santoro | G09G 5/14 | 345/1.3 |
| 2003/0023468 A1 * | 1/2003 | Aurrichio | G06Q 10/10 | 705/7.38 |
| 2003/0030664 A1 * | 2/2003 | Parry | G06F 9/4411 | 715/744 |
| 2003/0120711 A1 * | 6/2003 | Katz | H04L 69/329 | 718/106 |
| 2003/0164862 A1 * | 9/2003 | Cadiz | G06Q 10/107 | 715/838 |
| 2003/0233367 A1 * | 12/2003 | Uluakar | G06F 8/20 | 707/999.102 |
| 2004/0015783 A1 * | 1/2004 | Lennon | G06F 16/258 | 715/255 |
| 2004/0075677 A1 * | 4/2004 | Loyall | G10L 13/033 | 715/706 |
| 2004/0181543 A1 * | 9/2004 | Wu | G06F 16/90328 | 707/999.102 |
| 2004/0205287 A1 * | 10/2004 | Joder | G06Q 10/06 | 711/1 |
| 2004/0225955 A1 * | 11/2004 | Ly | G06Q 10/06 | 715/255 |
| 2005/0015745 A1 * | 1/2005 | Wain | G06F 8/34 | 717/109 |
| 2005/0022160 A1 * | 1/2005 | Uluakar | G06F 8/36 | 717/105 |
| 2005/0050095 A1 * | 3/2005 | Hurtis | G06Q 10/06 | |
| 2005/0054381 A1 * | 3/2005 | Lee | G06F 9/451 | 455/557 |
| 2005/0069107 A1 * | 3/2005 | Tanaka | H04N 7/142 | 348/E7.079 |
| 2005/0071305 A1 * | 3/2005 | Hugh | G06F 16/30 | 706/45 |
| 2005/0091184 A1 * | 4/2005 | Seshadri | G06Q 10/107 | |
| 2005/0143138 A1 * | 6/2005 | Lee | G06F 3/011 | 455/566 |
| 2006/0020942 A1 * | 1/2006 | Ly | G06F 9/5027 | 718/100 |
| 2006/0156246 A1 * | 7/2006 | Williams | G06F 16/54 | 715/764 |
| 2006/0210157 A1 | 9/2006 | Agnihotri et al. | | |
| 2007/0156761 A1 | 7/2007 | Smith, III | | |
| 2008/0021895 A1 | 1/2008 | Stevenson et al. | | |

(56) References Cited

U.S. PATENT DOCUMENTS

| | | | |
|---|---|---|---|
| 2008/0140385 A1 | 6/2008 | Mahajan et al. | |
| 2011/0093263 A1 | 4/2011 | Mowzoon | |
| 2011/0125761 A1* | 5/2011 | Naaman | G06F 16/36 707/748 |
| 2011/0184958 A1* | 7/2011 | Krishnamoorthy | G06Q 50/01 707/749 |
| 2011/0239107 A1 | 9/2011 | Phillips et al. | |
| 2013/0096898 A1* | 4/2013 | Usadi | G06N 20/00 703/10 |
| 2013/0290106 A1* | 10/2013 | Bradley | G06Q 90/20 705/323 |
| 2014/0223462 A1* | 8/2014 | Aimone | G16Z 99/00 725/10 |
| 2014/0229812 A1 | 8/2014 | Fisher | |
| 2014/0358475 A1* | 12/2014 | Boulkenafed | G01B 21/16 702/152 |
| 2014/0372346 A1* | 12/2014 | Phillipps | G06N 20/00 706/12 |
| 2015/0279390 A1 | 10/2015 | Mani | |
| 2016/0092793 A1* | 3/2016 | Garrow | G16H 70/40 706/12 |
| 2016/0170998 A1* | 6/2016 | Frank | G06F 16/908 707/748 |
| 2016/0320081 A1* | 11/2016 | Nikovski | G06F 16/2228 |
| 2016/0378847 A1* | 12/2016 | Byrnes | G06F 16/93 707/739 |
| 2017/0004260 A1* | 1/2017 | Moturu | G16H 10/60 |
| 2017/0235848 A1* | 8/2017 | Van Dusen | G06Q 30/0201 705/12 |
| 2017/0238056 A1* | 8/2017 | Greene | G06F 16/784 725/131 |
| 2017/0300933 A1* | 10/2017 | Mascaro | G06N 7/01 |
| 2018/0028079 A1* | 2/2018 | Gurevich | A61B 5/7232 |
| 2018/0032938 A1* | 2/2018 | Scriffignano | G06Q 10/0635 |
| 2018/0077538 A1* | 3/2018 | Matus | H04W 4/40 |
| 2018/0159879 A1* | 6/2018 | Mestha | H04L 63/1425 |
| 2018/0247020 A1* | 8/2018 | Itu | G16H 10/60 |
| 2018/0276861 A1* | 9/2018 | Wright | G06N 3/084 |
| 2018/0336481 A1* | 11/2018 | Guttmann | G06N 20/00 |
| 2019/0121431 A1* | 4/2019 | Lee | G06F 3/011 |
| 2019/0129732 A1* | 5/2019 | Sivertson | G06N 7/01 |
| 2019/0156216 A1* | 5/2019 | Gupta | G06N 3/126 |
| 2019/0159716 A1* | 5/2019 | Alailima | A61B 5/165 |
| 2019/0172564 A1* | 6/2019 | Chandra | G06N 20/00 |
| 2019/0228362 A1* | 7/2019 | Anagnostou | G06Q 10/0635 |
| 2019/0294990 A1* | 9/2019 | Lopez De Prado | G06N 20/00 |
| 2020/0050884 A1* | 2/2020 | Han | G06V 20/10 |
| 2020/0104401 A1* | 4/2020 | Burnett | G06F 16/287 |
| 2021/0089949 A1* | 3/2021 | Lu | G06N 3/08 |
| 2021/0192372 A1* | 6/2021 | Kang | G06F 16/9024 |

OTHER PUBLICATIONS

Alex Parsh, QuickTube Youtube Video Summarizer, Published Aug. 31, 2020 via Chrome web store, p. 1 (pdf).

* cited by examiner

TRANSFORMATION OF DATABASE ENTRIES FOR IMPROVED ASSOCIATION WITH RELATED CONTENT ITEMS

CROSS-REFERENCE TO RELATED APPLICATIONS

This is a continuation of U.S. application Ser. No. 17/888,868, filed on Aug. 16, 2022, which is a continuation of U.S. application Ser. No. 17/114,418, filed on Dec. 7, 2020, the entire contents of each of which are hereby incorporated by reference in their entireties.

FIELD

The present disclosure relates to transforming database entries and more particularly to analyzing database content items for improved viewing ability.

BACKGROUND

Content items, in particular videos, are published multiple times on a variety of platforms every day, leading to a quickly and ever-growing content repository. Traditional content item management strategies involve significant manual review efforts and cannot quickly adapt to changes in platform or review strategy. Thus, achieving beyond a high-level relationship between content items is inherently difficult, time consuming, and subject to variation among analysts reviewing content items.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A content analysis system includes processor hardware and memory hardware coupled to the processor hardware. The memory hardware stores data for an analyzed content database including analyzed content items and instructions for execution by the processor hardware. The instructions include, in response to a first intermediate content item being analyzed to generate a first text description, receiving the first intermediate content item and analyzing the first text description of the first intermediate content item to generate a first reduced text description of the first intermediate content item. The instructions include identifying a first set of tags corresponding to the first text description of the first intermediate content item by applying a tag model to the first text description and generating a first analyzed content item including the first intermediate content item, the first reduced text description, and the first set of tags. The instructions include adding the first analyzed content item to the analyzed content database and, in response to a displayed content item being associated with at least one tag of the first set of tags, displaying a first user-selectable link corresponding to the first analyzed content item on a portion of a user interface of a user device displaying the displayed content item.

In other features, analyzing the first text description includes applying a machine learning algorithm trained with a training dataset including text descriptions and corresponding reduced transcripts. In other features, the first reduced text description is a summary displayed in an icon with the first user-selectable link.

In other features, the instructions include analyzing the first text description of the first intermediate content item to generate a first title text description, and the first title text description includes fewer terms than the first reduced text description. In other features, the memory hardware stores data for a content database including content items uploaded directly from an analyst device and intermediate content items. In other features, each intermediate content item includes a corresponding text description.

In other features, the instructions include, in response to a first content item being uploaded to the content database and the first content item including audio and generating the first text description of the first content item by applying a machine learning algorithm to the audio of the first content item. In other features, the content items of the content database include videos, audio, text, or a combination thereof.

In other features, the instructions include, in response to a threshold interval elapsing, obtaining a set of text transcripts corresponding to content items from the analyzed content database and identifying a new tag by applying an unstructured machine learning algorithm to the set of text transcripts. In other features, the instructions include, in response to identifying the new tag, generating and transmitting an indicator of the new tag to an analyst device. In other features, the instructions include, in response to receiving a confirmation of the new tag from the analyst device, adding the new tag to the tag model.

In other features, the indicator of the new tag includes a set of corresponding text transcripts indicating the new tag, and the confirmation includes a name of the new tag. In other features, the set of text transcripts include text transcripts corresponding to content items stored within a threshold time.

A content analysis method includes, in response to a first intermediate content item being analyzed to generate a first text description, receiving the first intermediate content item. The content analysis method includes analyzing the first text description of the first intermediate content item to generate a first reduced text description of the first intermediate content item and identifying a first set of tags corresponding to the first text description of the first intermediate content item by applying a tag model to the first text description. The content analysis method includes generating a first analyzed content item including the first intermediate content item, the first reduced text description, and the first set of tags and adding the first analyzed content item to an analyzed content database. Data for the analyzed content database includes analyzed content items. The content analysis method includes, in response to a displayed content item being associated with at least one tag of the first set of tags, displaying a first user-selectable link corresponding to the first analyzed content item on a portion of a user interface of a user device displaying the displayed content item.

In other features, analyzing the first text description includes applying a machine learning algorithm trained with a training dataset including text descriptions and corresponding reduced transcripts. In other features, the first reduced text description is a summary displayed in an icon with the first user-selectable link. In other features, the content analysis method includes analyzing the first text description of the first intermediate content item to generate a first title text description. The first title text description includes fewer terms than the first reduced text description.

In other features, data for a content database includes content items uploaded directly from an analyst device and intermediate content items, and each intermediate content item includes a corresponding text description. In other features, the content analysis method includes, in response to a first content item being uploaded to the content database and the first content item including audio, generating the first text description of the first content item by applying a machine learning algorithm to the audio of the first content item.

In other features, the content items of the content database include videos, audio, text, or a combination thereof. In other features, the content analysis method includes, in response to a threshold interval elapsing, obtaining a set of text transcripts corresponding to content items from the analyzed content database and identifying a new tag by applying an unstructured machine learning algorithm to the set of text transcripts.

In other features, the content analysis method includes, in response to identifying the new tag, generating and transmitting an indicator of the new tag to an analyst device. In other features, the content analysis method includes, in response to receiving a confirmation of the new tag from the analyst device, adding the new tag to the tag model.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
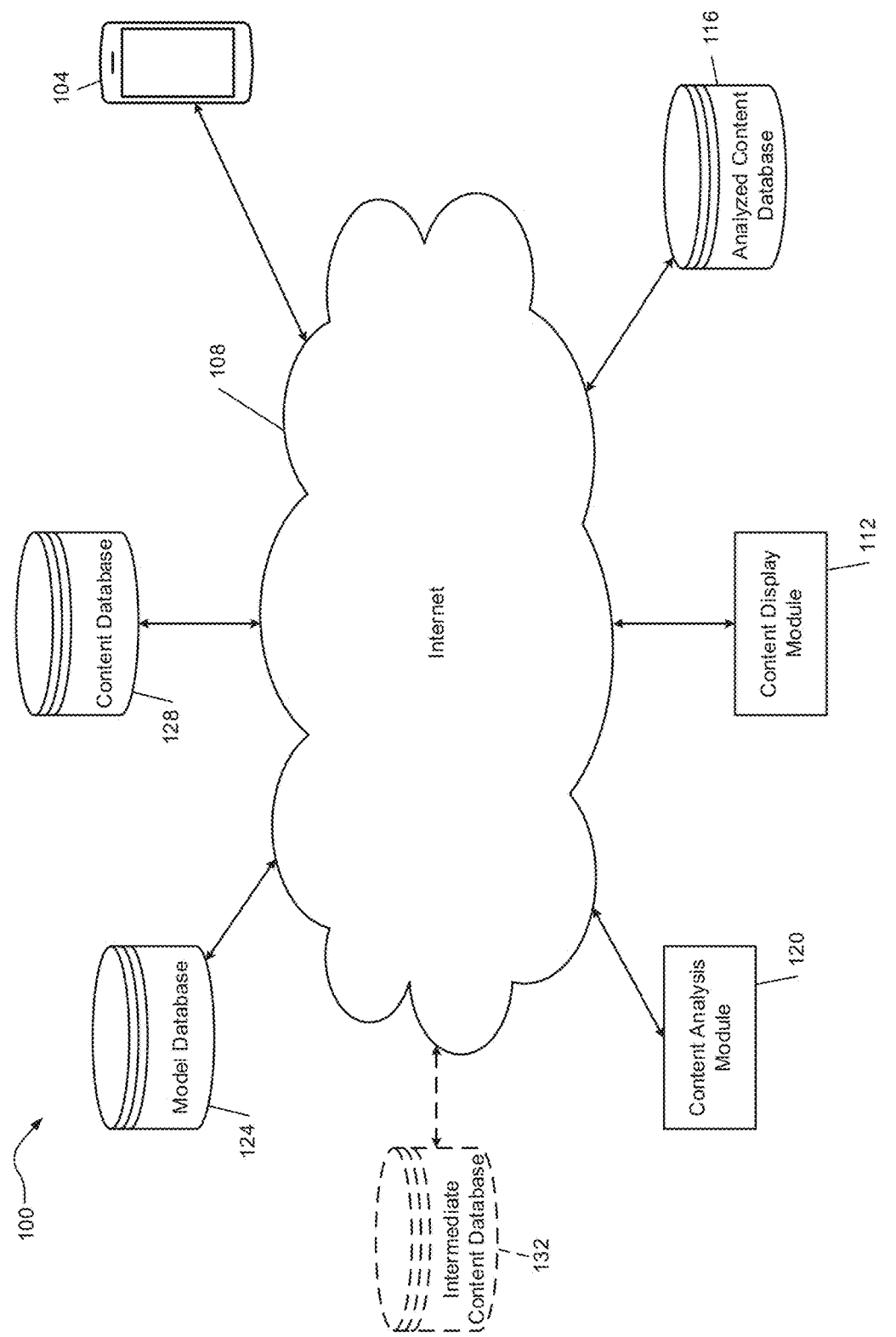
FIG. 1 is a high-level example block diagram of a content analysis system.

An on-demand content analysis system receives content items to generate text transcripts, summaries, and tags for the content items. The generated summaries and tags improve user experience for users of platforms displaying the content items, for example, by classifying and recommending content items based on the corresponding tag. The tags can assist in identifying related content items and the summaries can provide a user with accurate information prior to viewing or consuming the content item, for example, to see if the user would like to watch the full video, read an entire article, listen to a podcast, etc. The transcripts, summaries, and tags are available in near real-time, allowing for rapid cross-platform dissemination and intelligent content curation.

The content analysis system receives content items, such as videos including audio, once the content items are uploaded to a content database. For example, a content item may be uploaded by an analyst from a computing device, such as a mobile phone, tablet, laptop, etc. In various implementations, content items may be live streamed and the content analysis system may receive the content item while it is being live streamed.

The content analysis system implements a machine learning algorithm (text generation model) to generate text from an audio portion of the content item, providing a text transcript of the content item. In various implementations, the content item may be an article or another type of content item excluding audio. Therefore, since the content item may exclude audio, the generation of the text transcript may be separate from a module or system generation a summary and tag. Then, for those content items excluding audio and already including a text transcript (article), the text transcript does not need to be generated, only a summary and tag(s). Iterative fine-tuning of the text generation module ensures progressively improved sensitivity to financial and trading vocabulary that standard speech-to-text engines do not detect.

The machine learning algorithm may implement natural language processing to generate the text and continues to learn from new content items. The machine learning algorithm may be trained using a training dataset including a variety of content items and corresponding text versions of the corresponding audio. In various implementations, the machine learning algorithm may be further trained using other content items, such as articles, podcasts, etc.

The machine learning algorithm may be specific to the platform and the type of content items. For example, for a financial platform, the machine learning algorithm will learn and encounter financial terms more frequently. Therefore, the machine learning algorithm that generates text for content items offered by the financial platform may be trained using financial content items, including videos, articles, etc.

Because the machine learning algorithm generates text to match speech included in the audio, an analyst no longer spends time listening to and watching the content item to type a transcript. Instead, the machine learning algorithm generates terms with corresponding timestamps of the audio to operate as closed captioning. In various implementations, the analyst can correct any errors in the text transcript, such as a term of art or a name, by inputting the phonetical spelling of the term or name and the corrected spelling, so the machine learning algorithm learns the sound of the word, phonetic spelling, and correct spelling.

Once the text transcript is generated for a content item, the content analysis system can analyze the generated text transcript using additional machine learning algorithms to generate a summary based on the text and a set of tags based on the text. For example, a summary model implementing another machine learning algorithm can generate a summary of the content item from the generated text transcript that includes speech from the audio of the content item. The generated summary may be displayed under the content item for a user to read prior to, for example, watching the content item. The summary model may generate a short and a long summary. The short summary may be a title of the content item. The automation of summary generation also reduces the burden on analysts to listen to or read transcripts and draft a summary for each content item.

Similar to the generated text transcript, the summary model may be trained using a training dataset including example summaries and corresponding transcripts. Additionally, the summary model may be trained to identify salient or key terms to include in the summary, based on frequency or importance.

Another machine learning algorithm may identify appropriate tags for the content item in order to classify the content item as related to other content items with the same tag. For example, a tag model may classify the content item based on the generated text transcript into one or more tags or categories and associate the content item with the identified tag or tags. Moreover, fine-tuning the summary model and tag model, like the text generation module, allows for the system to learn trading-relevant phrases that would be missed with standard approaches.

Additionally, the content analysis system may include an unstructured machine learning algorithm to identify new terms or phrases that indicate a new tag, for example, using K-means clustering. Once a cluster is identified, the identified term or phrase may be forwarded to an analyst for review and to generate a tag for the identified term or phrase. The analyst can then update the tag model, which is trained using training datasets including tags and associated text indicating the corresponding tag. In various implementations, the content analysis system may be implemented to generate text transcripts for phone calls, chat systems, etc. and summarize and tag those content items accordingly for faster review and identification of an intent for those items.

The content analysis system summarizes text and identifies topics, which are made available within seconds, to facilitate a quick turnaround to help load content items to a relevant site location and review processes. Once analyzed the content item, generated text transcript, summary, and associated tags can be uploaded to an analyzed content database, which is accessible by a corresponding platform or website. The content items may be presented on a user interface to a user of the platform and user-selectable links to related topics based on the tags of each content item are also displayed on the user interface. The recommended and related content items may be determined based on tags or user search history.

FIG. 1 is a high-level example block diagram of a content analysis system 100. A user can access a particular platform associated with an entity, for example, a financial instruction, using a user device 104. For example, the user may access, using the user device 104 via the Internet 108, a content display module 112 operated by the entity to view content items stored in an analyzed content database 116. The content items stored in the analyzed content database 116 have been analyzed by a content analysis module 120, using models stored in a model database 124.

The models stored in the model database 124 are used to analyze content items uploaded to a content database 128. The content items uploaded to the content database 128 may be uploaded by analysts using a computing device, such as the user device 104. Analysts may upload to the content database 128 or live stream content items to the content display module 112 using a mobile phone, tablet, laptop, etc.

The content analysis module 120 obtains content items uploaded to the content database 128 to analyze the content item using multiple models implementing machine learning algorithms. The models are stored in the model database 124. The models generate a text transcript of the content item to be displayed on a video of the content item when viewed by a user through the content display module 112. In various implementations, after generation of the text transcripts, the content items may optionally be temporarily stored in an intermediate content database 132 and analyzed further by a separate module.

From the generated text transcript, a summary model and a tag model generate a summary description of the content item and associated tags related to the content item, respectively. The analyzed content item, including the text transcript, the summary, and associated tags are uploaded in the analyzed content database 116. In various implementations, the analyzed content database 116 and the content database 128 may be a single database. The content display module 112 may obtain analyzed content items from the analyzed content database 116 for display to users via a platform, for example, through a web portal. The user device 104 can access, via the Internet 108, the content display module 112 to view content items.

Figure 2:
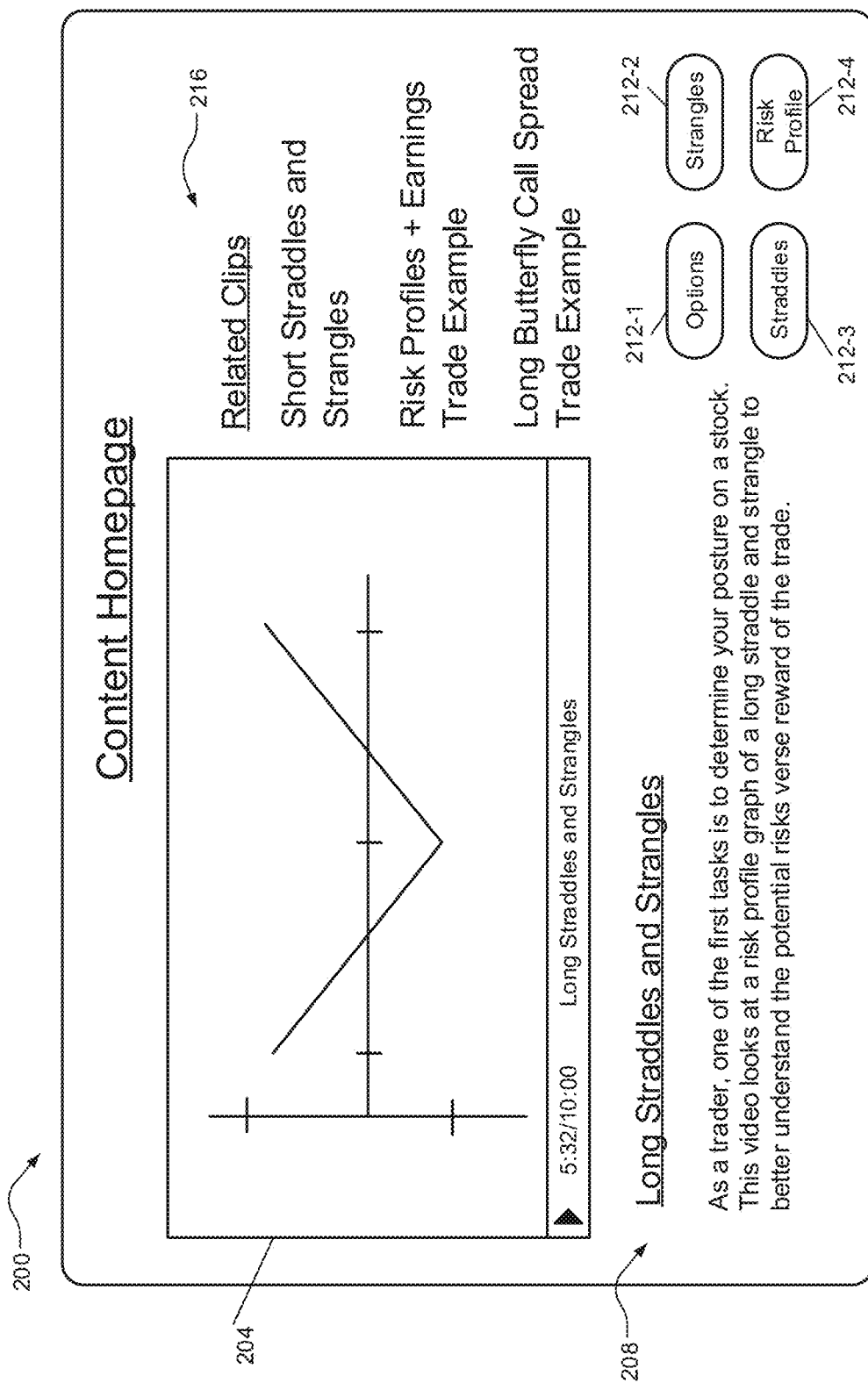
FIG. 2 is a representation of an example user interface for displaying content items on a content homepage.

FIG. 2 is a representation of an example user interface for displaying content items on a content homepage 200. In various implementations, the content homepage may be viewed on the user device 104 using the content display module 112 of FIG. 1. The content display module 112 of FIG. 1 obtains content items from the analyzed content database 116 for viewing. The content homepage 200 displays a content item 204, which may be a video, article, podcast, exclusively audio, chat transcript, etc. The content homepage 200 also includes a content item summary 208 and a set of tags 212-1, 212-2, 212-3, and 212-4, collectively 212.

The content homepage 200 may also include a related clips section 216. The related clips section 216 may include user-selectable links to other content items stored in the analyzed content database 116 of FIG. 1. The related clips section 216 may include content items that are associated with the set of tags 212 associated with the content item 204 being consumed.

Figure 3B:
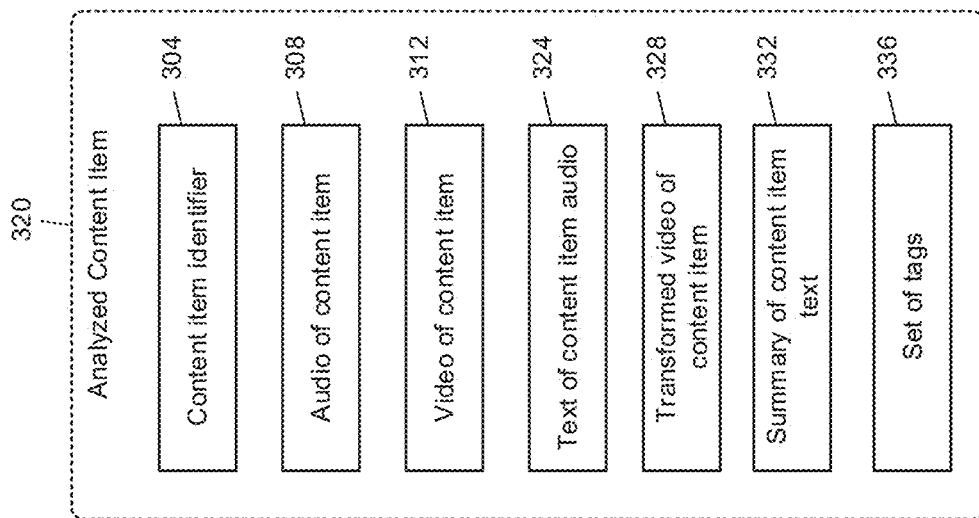
FIGS. 3A-3B are representations of example video content items.
Figure 3A:
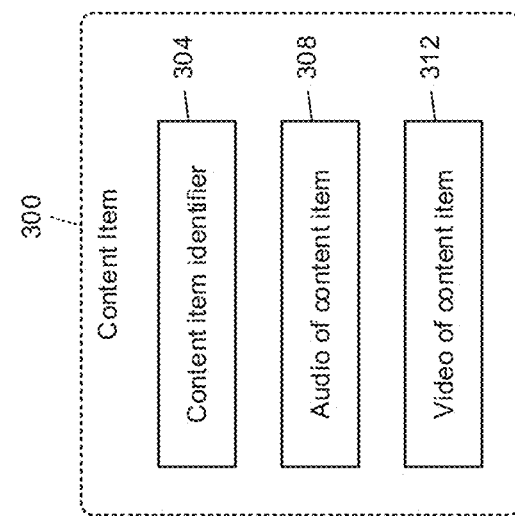

FIGS. 3A-3B are representations of example video content items. FIG. 3A represents an example content item 300 before being analyzed by the content analysis system of FIG. 1. The content item 300 includes a content item identifier 304, audio of the content item 308, and a video of the content item 312. FIG. 3B depicts an analyzed content item 320. The analyzed content item includes the content item identifier 304, the audio of the content item 308, the video of the content item 312, text of the content item audio 324, a transformed video of the content item 328, a summary of the content item text 332, and a set of tags 336.

As described previously and in more detail below, the content item 300 is analyzed to generate the text of the content item audio 324, the summary of the content item text 332, and the set of tags 336. Additionally, the video of the content item 312 may be transformed into the transformed video of the content item 328, which includes the text of the content item audio 324 overlaid on the video of the content item 312.

Figure 4:
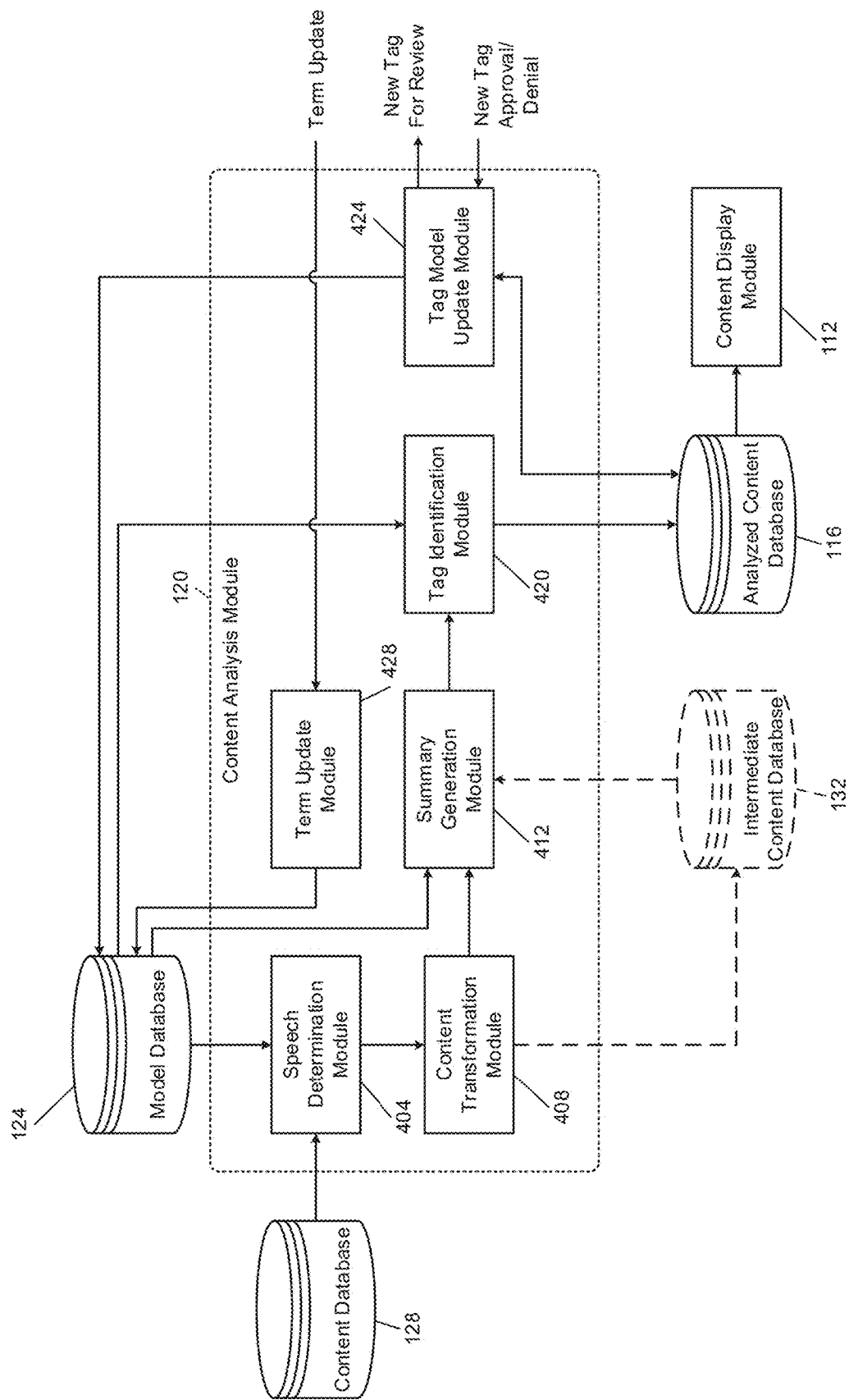
FIG. 4 is a functional block diagram of an example content analysis module.

FIG. 4 is a functional block diagram of an example content analysis module 120. The content analysis module 120 obtains content items from the content database 128. In various implementations, the content analysis module 120 may receive content items directly from user devices, which may be live streamed. The content analysis module 120 includes a speech determination module 404 for receiving the content item from the content database 128. The speech determination module 404 obtains a text generation model from the model database 124.

The text generation model implements a natural language processing machine learning algorithm to convert the audio of the content item into a text transcript. The text generation model may be trained using a training dataset including audio and corresponding text transcripts. The text generation model may further be trained using general audio and corresponding text transcripts as well as using platform specific training data. For example, the content analysis system 100 may be implemented on a financial platform. Therefore, the text generation model may be trained using audio and corresponding text transcripts associated with financial entities. In this way, the text generation model is improved for use on a financial platform.

Once the speech determination module 404 applies the text generation model to the audio of the content item, the speech determination module 404 associates the text transcript with the identifier of the content item and forwards the content item to a content transformation module 408. The content transformation module 408 may transform the video included in the content item to include the generated text transcript. That is, the content transformation module 408 may overlay the generated text transcript over the video of the content item.

In various implementations, the content transformation module 408 alters the video of the content item to include the generated text transcript. Alternatively, the content transformation module 408 generates a new video of the content item to include the original video and audio of the content item and overlay the generated text transcript over the original video. The transformed video is associated with the identifier of the content item.

The content transformation module 408 may forward the content item to a summary generation module 412. The content transformation module 408 may optionally store the content item, including the generated text transcript and the transformed video, in the intermediate content database 132. In the above implementation, the summary generation module 412 obtains content items from the intermediate content database 132. Additionally, in an implementation including the intermediate content database 132, the content analysis module 120 may be separated to process content items to generate the text transcript and generate summaries and tags in another, distinct module.

The summary generation module 412 obtains a summary model from the model database 124. The summary model implements a machine learning algorithm to generate a text summary describing the content item based on the generated text transcript. In various implementations, the summary model is trained using a training dataset of text transcripts and corresponding summaries.

As mentioned above, the summary model may also be trained using a training dataset specifically related to the type of platform. The summary generation module 412 applies the summary model to the text transcript of the content item and associates the generated summary with the identifier of the content item. In various implementations, the summary generation module 412 generates a short summary and a long summary. For example, the short summary may be used as a title of the content item while the long summary may be displayed as a description.

The summary generation module 412 forwards the content item to a tag identification module 420. The tag identification module 420 obtains a tag model from the model database 124. The tag model implements a machine learning algorithm to identify a set of tags associated with the text transcript of the content item. The tag model may be trained using a recognized set of tags and associated content items corresponding to each of the tags. For example, on a financial platform, the tags may include options, strangles, straddles, and risk profile, as shown in FIG. 2. The tags may further include other key terms identified across text transcript training data.

Once the tag identification module 420 applies the tag model to the text transcript of the content item, the identified set of tags are associated with the content item. The analyzed content item is then stored in the analyzed content database 116. The content display module 112 can obtain the analyzed content item from the analyzed content database 116 for viewing by a user on the corresponding platform. The content display module 112 may also obtain related analyzed content items for recommendation to a user via the user interface based on the set of tags associated with the displayed content item.

In various implementations, the content analysis module 120 may include a tag model update module 424. The tag model update module 424 may implement unsupervised learning such as K-means clustering, to cluster key terms of text transcripts to identify new tags from the analyzed content items stored in the analyzed content database 116. For example, the tag model update module 424 may obtain a set of analyzed content items from the analyzed content database 116 to identify new or trending terms that may qualify as a new tag.

The tag model update module 424 generates and transmits a new tag alert to an analyst device if a potential new tag is identified. The alert may include the new tag along with content items that correspond to the new tag. An analyst may manually review the new tag and corresponding content items to approve or deny the creation of the new tag. If the new tag is approved, the tag model update module 424 updates the tag model of the model database 124 to include the new tag. The tag model update module 424 may also update the identified content items of the analyzed content database 116 to include the new tag.

In various implementations, the tag model update module 424 may generate and transmit an alert including the text transcripts of the corresponding content items in which a new tag was identified. Then, the analyst can review the content items to determine a name of the new tag. Then, the analyst would return the name of the new tag to the tag model update module 424 along with which of the content items that the new tag corresponds.

The content analysis module 120 may also include a term update module 428. The term update module 428 allows an analyst to alter a term included in the text generation model. That is, if the analyst is viewing a content item and notices that the text transcript includes an incorrect word, such as a misspelling of a name or a financial term, the analyst can update the term by including a phonetic spelling and correct spelling of the term. The corrected and phonetic spelling of the corresponding term are received by the term update module 428 and the text generation model is updated and taught the correct spelling (and perceived spelling) of the term.

Figure 5:
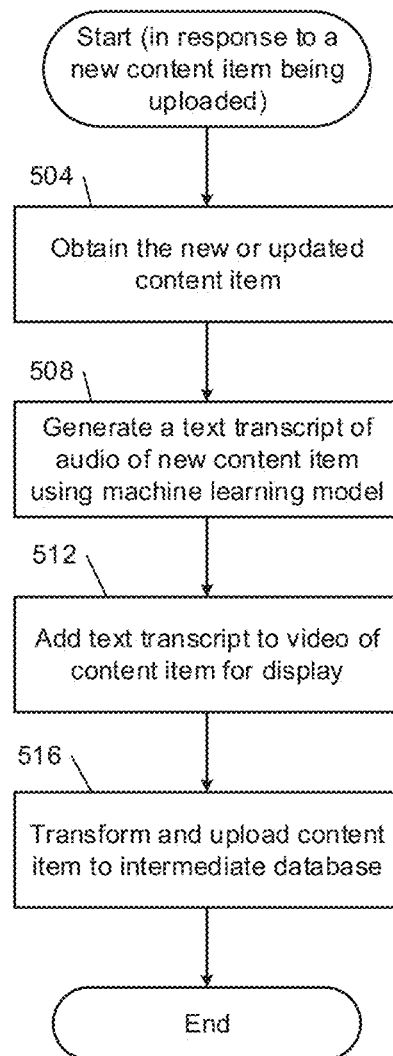
FIG. 5 is a flowchart depicting example generation of a text transcript corresponding to audio.

FIG. 5 is a flowchart depicting example generation of a text transcript corresponding to audio content items. Control begins in response to a new content item being uploaded to a particular database. In various implementations, control may begin in response to receiving the new content item, which is directly uploaded for analysis. Once the new content item is uploaded, control obtains the new or updated content item at 504. As new content items are uploaded, previous content items may be updated and uploaded. At 508, control generates a text transcript of audio of the new content item using a machine learning model.

Control proceeds to 512 to add the text transcript to video of the content item for display. As described above, the text transcript may overlay the video. In various implementations, the text transcript includes time points indicating the time at which each term in the text transcript is being recited in the audio. Control then continues to 516 to transform and upload the content item to an intermediate content database. That is, the transformed content item may be stored in a separate, intermediate content database prior to additional analyses. Then, control ends. In various implementations, FIGS. 5 and 6 may be optionally combined if a single module analyzes the content items one at a time to generate the text transcript, the summary, and the set of tags, removing the intermediate content database. Additionally or alternatively, the content item is analyzed to generate a text transcript and the summary and set of tags are generated in memory via application programming interface (API) calls to improve analysis of the content items.

Figure 6:
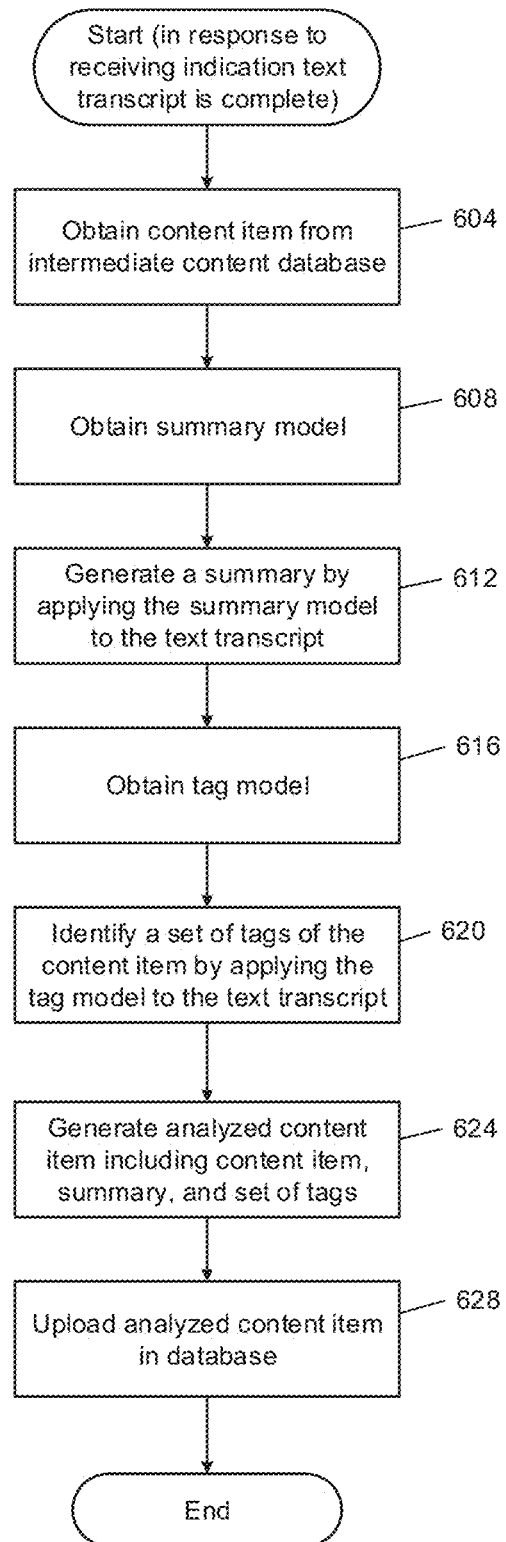
FIG. 6 is a flowchart depicting example generation of a summary and a tag for a content item.

FIG. 6 is a flowchart depicting example generation of a summary and a tag for a content item. Control begins in response to receiving an indication that the text transcript of the content item is complete. At 604, control obtains the content item from the intermediate content database, which includes the corresponding text transcript. Control continues to 608 to obtain a summary model. At 612, control generates a summary of the content items by applying the summary model to the text transcript. In various implementations, control generates a short summary, for example, a title, and a long summary. The long summary may be displayed along with a title of the content item, allowing the user to read a short description and title of the content item prior to consuming or watching.

Control continues to 616 to obtain a tag model. At 620, control identifies a set of tags of the content item by applying the tag model to the text transcript. Control proceeds to 624 to generate the analyzed content item including the content item (and text transcript generated in FIG. 5), the summary, and the set of tags. Control continues to 628 to upload the analyzed content item to a database. Then, control ends.

Figure 7:
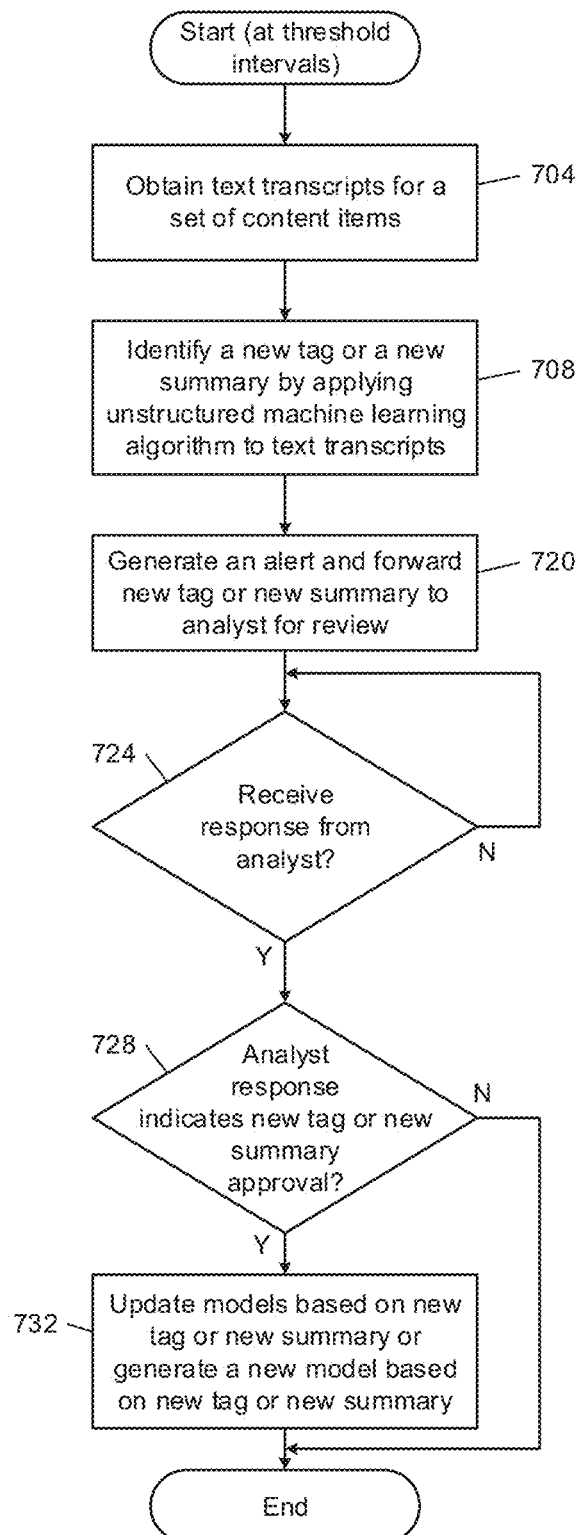
FIG. 7 is a flowchart depicting example identification of new tags for analyst review.

FIG. 7 is a flowchart depicting example identification of new tags for analyst review. Control begins at threshold intervals. For example, control may be performed hourly, daily, etc. At 704, control obtains text transcripts for a set of content items. For example, control may obtain text transcripts for content items over a threshold period, such as the previous day, to determine if a new tag or a new summary should be generated based on a new term or phrase trending throughout the recent content items.

Control continues to 708 to identify a new tag or a new summary by applying an unstructured machine learning algorithm to the text transcripts. Then, at 720, control continues to generate an alert and forward the new tag or new summary to an analyst for review.

Control proceeds to 724 to wait to receive a response from the analyst. That is, control determines if a response from the analyst was received. If no, control waits. If yes, control continues to 728 to determine if the analyst approved the new tag or the new summary. If no, control ends. If yes, control continues to 732 to update the corresponding model based on the identified new tag or new summary or generate a new model based on the new tag or the new summary. That is, as a result of the identified new tag or new summary, a new model may be created which may be stored in a model database. Alternatively, the new tag or new summary may be used to update existing machine learning models. Then, control ends.

In various implementations, the response received from the analyst may identify a missing tag or a different summary instead of approving suggested new tags and suggested new summaries. For example, the analyst may review the text transcripts indicating the new tag and identify a different tag that should be applied or associated with those transcript. Further, the analyst may review the text transcripts the new summary is based on and suggest a different summary. The analyst would then include the different tag or summary in their response.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. The phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A content analysis system comprising:
    memory hardware, the memory hardware having a content database and computer readable instructions stored thereon, the content database including a tag model associated with an unstructured machine learning algorithm; and
    processor hardware configured to execute the computer readable instructions to cause the system to,
    obtain at least one first text transcript corresponding to at least one first content item, the at least one first content item being one of a plurality of media types,
    automatically determine whether at least one potential new tag is to be generated by applying the unstructured machine learning algorithm to the at least one first text transcript,
    transmit an alert regarding the at least one potential new tag to be generated to at least one analyst user device based on results of the determination,
    receive a confirmation from the at least one analyst user device in response to the alert,
    update the tag model associated with the unstructured machine learning algorithm in response to receiving the confirmation, the updating the tag model including adding the at least one potential new tag as a new tag to the tag model, and
    associate the at least one first content item with the new tag in the content database.

2. The content analysis system of claim 1, wherein the system is further caused to perform the automatically determining whether the at least one potential new tag is to be generated by:
- identifying at least one new key term present in the at least one first text transcript based on an unsupervised machine learning process of the unstructured machine learning algorithm.

3. The content analysis system of claim 2, wherein the system is further caused to identify the at least one new key term by:
- clustering key terms of the at least one first text transcript using the unsupervised machine learning process; and
- comparing each of the clustered key terms to a plurality of tags stored in the tag model to identify the at least one new key term.

4. The content analysis system of claim 1, wherein the system is further caused to perform the automatically determining whether the at least one potential new tag is to be generated by:
- identifying at least one trending key term present in the at least one first text transcript based on an unsupervised machine learning process of the unstructured machine learning algorithm.

5. The content analysis system of claim 4, wherein the system is further caused to identify the at least one trending key term by:
- clustering key terms of the at least one first text transcript using the unsupervised machine learning process; and
- comparing each of the clustered key terms to a plurality of tags stored in the tag model to identify the at least one trending key term.

6. The content analysis system of claim 1, wherein
- the confirmation includes a new name for the at least one potential new tag from the at least one analyst user device; and
- the processor hardware is further configured to execute the computer readable instructions to cause the system to update the tag model by adding the at least one potential new tag as the new tag to the tag model using the new name.

7. The content analysis system of claim 6, wherein the processor hardware is further configured to execute the computer readable instructions to cause the system to:
- obtain at least one second content item; and
- identify a set of tags corresponding to the at least one second content item by applying the updated tag model to a text description of the at least one second content item.

8. The content analysis system of claim 1, wherein
- the transmitted alert regarding the at least one potential new tag includes the at least one first text transcript;
- the confirmation includes at least one modification to the at least one first text transcript from the at least one analyst user device; and
- the processor hardware is further configured to execute the computer readable instructions to cause the system to update the content database, the updating the content database including adding the at least one modification to the at least one first text transcript to the content database in association with the at least one first content item.

9. The content analysis system of claim 8, wherein the processor hardware is further configured to execute the computer readable instructions to cause the system to:
- obtain at least one second content item; and
- generate at least one text transcript of the at least one second content item based on the updated content database.

10. The content analysis system of claim 1, wherein the processor hardware is further configured to execute the computer readable instructions to cause the system to:
- obtain at least one second content item over a period of time; and
- in response to the period of time exceeding a desired time interval,
  - obtaining at least one second text transcript corresponding to the at least one second content item,
  - automatically determining whether at least one potential second new tag is to be generated by applying the unstructured machine learning algorithm to the at least one second text transcript, and
  - transmitting a second alert regarding the at least one potential second new tag to be generated to the at least one analyst user device based on results of the determination.

11. A non-transitory computer readable medium storing computer readable instructions, which when executed by processor hardware of a content analysis system, cause the content analysis system to:
- obtain at least one first text transcript corresponding to at least one first content item, the at least one first content item being one of a plurality of media types;
- automatically determine whether at least one potential new tag is to be generated by applying an unstructured machine learning algorithm to the at least one first text transcript, the unstructured machine learning algorithm associated with a tag model;
- transmit an alert regarding the at least one potential new tag to be generated to at least one analyst user device based on results of the determination;
- receive a confirmation from the at least one analyst user device in response to the alert;
- update the tag model associated with the unstructured machine learning algorithm in response to receiving the confirmation, the updating the tag model including adding the at least one potential new tag as a new tag to the tag model; and
- associate the at least one first content item with the new tag in a content database, the content database including the tag model associated with the unstructured machine learning algorithm.

12. The non-transitory computer readable medium of claim 11, wherein the content analysis system is further caused to perform the automatically determining whether the at least one potential new tag is to be generated by:
- identifying at least one new key term present in the at least one first text transcript based on an unsupervised machine learning process of the unstructured machine learning algorithm.

13. The non-transitory computer readable medium of claim 12, wherein the content analysis system is further caused to identify the at least one new key term by:
- clustering key terms of the at least one first text transcript using the unsupervised machine learning process; and
- comparing each of the clustered key terms to a plurality of tags stored in the tag model to identify the at least one new key term.

14. The non-transitory computer readable medium of claim 11, wherein the content analysis system is further caused to perform the automatically determining whether the at least one potential new tag is to be generated by:

identifying at least one trending key term present in the at least one first text transcript based on an unsupervised machine learning process of the unstructured machine learning algorithm.

15. The non-transitory computer readable medium of claim 14, wherein the content analysis system is further caused to identify the at least one trending key term by:
  clustering key terms of the at least one first text transcript using the unsupervised machine learning process; and
  comparing each of the clustered key terms to a plurality of tags stored in the tag model to identify the at least one trending key term.

16. The non-transitory computer readable medium of claim 11, wherein the execution of the computer readable instructions by the processor hardware further causes the content analysis system to:
  obtain at least one second content item; and
  identify a set of tags corresponding to the at least one second content item by applying the updated tag model to a text description of the at least one second content item.

17. The non-transitory computer readable medium of claim 11, wherein
  the transmitted alert regarding the at least one potential new tag includes the at least one first text transcript;
  the confirmation includes at least one modification to the at least one first text transcript from the at least one analyst user device; and
  the execution of the computer readable instructions by the processor hardware further causes the content analysis system to,
    update the content database, the updating the content database including adding the at least one modification to the at least one first text transcript to the content database in association with the at least one first content item,
    obtain at least one second content item, and
    generate at least one text transcript of the at least one second content item based on the updated content database.

18. The non-transitory computer readable medium of claim 11, wherein the execution of the computer readable instructions by the processor hardware further causes the content analysis system to:
  obtain at least one second content item over a period of time; and
  in response to the period of time exceeding a desired time interval,
    obtaining at least one second text transcript corresponding to the at least one second content item,
    automatically determining whether at least one potential second new tag is to be generated by applying the unstructured machine learning algorithm to the at least one second text transcript, and
    transmitting a second alert regarding the at least one potential second new tag to be generated to the at least one analyst user device based on results of the determination.

19. A method of operating a content analysis system comprising:
  obtaining at least one first text transcript corresponding to at least one first content item, the at least one first content item being one of a plurality of media types;
  automatically determining whether at least one potential new tag is to be generated by applying an unstructured machine learning algorithm to the at least one first text transcript, the unstructured machine learning algorithm associated with a tag model;
  transmitting an alert regarding the at least one potential new tag to be generated to at least one analyst user device based on results of the determination;
  receiving a confirmation from the at least one analyst user device in response to the alert;
  updating the tag model associated with the unstructured machine learning algorithm in response to receiving the confirmation, the updating the tag model including adding the at least one potential new tag as a new tag to the tag model; and
  associating the at least one first content item with the new tag in a content database, the content database including the tag model associated with the unstructured machine learning algorithm.

* * * * *